(12) United States Patent
Song et al.

(10) Patent No.: US 10,466,797 B2
(45) Date of Patent: Nov. 5, 2019

(54) POINTING INTERACTION METHOD, APPARATUS, AND SYSTEM

(71) Applicants: Huawei Technologies Co., Ltd., Shenzhen (CN); University of Electronic Science and Technology of China, Chengdu (CN)

(72) Inventors: Xingguang Song, Beijing (CN); Hong Cheng, Chengdu (CN); Yanli Ji, Chengdu (CN); Yang Zhao, Chengdu (CN); Guo Ye, Chengdu (CN)

(73) Assignees: HUAWEI TECHNOLOGIES CO., LTD., Shenzhen (CN); UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 15/284,273

(22) Filed: Oct. 3, 2016

(65) Prior Publication Data

US 2017/0024015 A1   Jan. 26, 2017

Related U.S. Application Data

(63) Continuation of application No. PCT/CN2015/075794, filed on Apr. 2, 2015.

(30) Foreign Application Priority Data

Apr. 3, 2014 (CN) .......................... 2014 1 0133397

(51) Int. Cl.
*G06F 3/01* (2006.01)
*H04N 13/204* (2018.01)
(Continued)

(52) U.S. Cl.
CPC .............. *G06F 3/017* (2013.01); *G06F 3/011* (2013.01); *G06F 3/0304* (2013.01);
(Continued)

(58) Field of Classification Search
CPC ........ G06F 3/011; G06F 3/017; G06F 3/0304; G06T 5/002; G06T 7/73;
(Continued)

(56) References Cited

U.S. PATENT DOCUMENTS 6,434,255 B1   8/2002   Harakawa
6,531,999 B1   3/2003   Trajkovic
(Continued)

FOREIGN PATENT DOCUMENTS

CN   1380996 A   11/2002
CN   1423796 A   6/2003
(Continued)

OTHER PUBLICATIONS

Wikipedia, Edge detection, Feb. 21, 2013 https://web.archive.org/web/20130221081655/http://en.wikipedia.org/wiki/Edge_detection (Year: 2013).*
(Continued)

*Primary Examiner* — Christopher E Leiby
(74) *Attorney, Agent, or Firm* — Leydig, Voit & Mayer, Ltd.

(57) ABSTRACT

Embodiments of the present invention provide a pointing interaction method, apparatus, and system. The method includes: obtaining a hand image and an arm image; determining spatial coordinates of a fingertip according to the hand image, and determining spatial coordinates of an arm key portion according to the arm image; and performing converged calculation on the spatial coordinates of the fingertip and the spatial coordinates of the arm key portion, to determine two-dimensional coordinates, on a display
(Continued)

screen, of an intersection point between fingertip pointing and the display screen. Therefore, the pointing interaction apparatus can implement high-precision pointing only by using the spatial coordinates of the fingertip and the spatial coordinates of the arm key portion, and the pointing has good realtimeness.

15 Claims, 3 Drawing Sheets

(51) Int. Cl.
  *G06F 3/03*  (2006.01)
  *G06T 5/00*  (2006.01)
  *G06T 7/73*  (2017.01)
  *G06K 9/00*  (2006.01)
  *G06K 9/46*  (2006.01)

(52) U.S. Cl.
  CPC .......... *G06K 9/00355* (2013.01); *G06T 5/002* (2013.01); *G06T 7/73* (2017.01); *H04N 13/204* (2018.05); *G06K 9/4604* (2013.01); *G06T 2207/10028* (2013.01); *G06T 2207/20036* (2013.01); *G06T 2207/30196* (2013.01)

(58) Field of Classification Search
  CPC . G06T 2207/10028; G06T 2207/30196; G06T 2207/20036; H04N 13/0203; G06K 9/00355; G06K 9/4607
  See application file for complete search history.

(56) References Cited

U.S. PATENT DOCUMENTS

| | | | |
|---|---|---|---|
| 8,149,210 B2 | 4/2012 | Klier et al. | |
| 8,686,943 B1* | 4/2014 | Rafii | G06F 3/017 |
| | | | 345/158 |
| 9,081,418 B1* | 7/2015 | Yao | G06F 3/0304 |
| 2002/0097218 A1 | 7/2002 | Gutta et al. | |
| 2003/0076299 A1 | 4/2003 | Trajkovic | |
| 2012/0134576 A1* | 5/2012 | Sharma | G06K 9/4604 |
| | | | 382/155 |
| 2013/0147790 A1 | 6/2013 | Hildreth et al. | |
| 2013/0147793 A1 | 6/2013 | Jeon et al. | |
| 2013/0271371 A1* | 10/2013 | Tsou | G06F 3/017 |
| | | | 345/158 |
| 2014/0232631 A1* | 8/2014 | Fleischmann | G06F 3/017 |
| | | | 345/156 |
| 2015/0062010 A1* | 3/2015 | Lin | G06F 3/017 |
| | | | 345/157 |

FOREIGN PATENT DOCUMENTS

| | | |
|---|---|---|
| CN | 1912816 A | 2/2007 |
| CN | 101344816 A | 1/2009 |
| CN | 102122345 A | 7/2011 |
| CN | 102567703 A | 7/2012 |
| CN | 102855461 A | 1/2013 |
| CN | 102890607 A | 1/2013 |
| CN | 103164022 A | 6/2013 |
| CN | 103226387 A | 7/2013 |
| CN | 103294996 A | 9/2013 |
| CN | 103295016 A | 9/2013 |
| CN | 103309466 A | 9/2013 |
| CN | 103383731 A | 11/2013 |
| CN | 103500010 A | 1/2014 |
| CN | 103677274 A | 3/2014 |

OTHER PUBLICATIONS

Wikipedia, Error function, May 8, 2012 https://web.archive.org/web/20120508083423/http://en.wikipedia.org/wiki/Error_function (Year: 2012).*

* cited by examiner

POINTING INTERACTION METHOD, APPARATUS, AND SYSTEM

CROSS-REFERENCE TO RELATED APPLICATIONS

This application is a continuation of International Application No. PCT/CN2015/075794, filed on Apr. 2, 2015, which claims priority to Chinese Patent Application No. 201410133397.1, filed on Apr. 3, 2014. Both of the aforementioned applications are hereby incorporated by reference in their entireties.

TECHNICAL FIELD

Embodiments of the present invention relate to an interaction method and apparatus, and in particular, to a pointing interaction method, apparatus, and system.

BACKGROUND

Because a projection system is often used in a teaching or conference presentation process, an operator usually needs to use a remote pointing tool.

Currently, most operators use a laser pointer as a remote pointing tool, one type is handheld, and another type is wearable. A size of the laser pointer is relatively small regardless of which form the laser pointer uses. In addition, because a user often uses the laser pointer in a moving process, the laser pointer is likely to be placed somewhere and forgotten. In addition, the laser pointer generally consumes relatively much power, and sometimes cannot be used because a battery is not replaced in time. All these bring great inconvenience to the user.

A pointing system is proposed in the prior art. In the pointing system, pointing is determined according to by using a relationship between an eye and a fingertip, between a back and a fingertip, or between a head position and a fingertip.

However, precision of pointing performed by using a relationship between an eye and a fingertip, between a back and a fingertip, or between a head position and a fingertip is not high.

SUMMARY

To overcome the disadvantage in the prior art, the present invention provides a pointing interaction method, apparatus, and system, so that an operator can implement a pointing function similar to a laser pointer only by using the fingertip point without wearing the laser pointer, where realtimeness is good, precision is high, and an operation habit of people is met.

According to a first aspect, an embodiment of the present invention provides a pointing interaction method, including: obtaining a hand image and an arm image; determining spatial coordinates of a fingertip according to the hand image, and determining spatial coordinates of an arm key portion according to the arm image; and performing converged calculation on the spatial coordinates of the fingertip and the spatial coordinates of the arm key portion, to determine two-dimensional coordinates, on a display screen, of an intersection point between fingertip pointing and the display screen.

With reference to the first aspect, in a first possible implementation manner of the first aspect, the obtaining a hand image and an arm image specifically includes: obtaining a depth map shot by a depth camera; and extracting the hand image and the arm image in the depth map according to a specified threshold of the depth map.

With reference to the first possible implementation manner of the first aspect, in a second possible implementation manner of the first aspect, after the obtaining a depth map shot by a depth camera, the method further includes: performing denoising processing on the depth map.

With reference to any one of the first aspect, the first possible implementation manner of the first aspect, or the second possible implementation manner of the first aspect, in a third possible implementation manner of the first aspect, the determining spatial coordinates of a fingertip according to the hand image specifically includes: extracting a hand contour according to the hand image; and if the fingertip is not perpendicular to the display screen, determining the spatial coordinates of the fingertip by performing curvature recognition on the hand contour; or if the fingertip is perpendicular to the display screen, calculating the spatial coordinates of the fingertip by performing Gaussian distribution on the hand contour.

With reference to any one of the first aspect, the first possible implementation manner of the first aspect, the second possible implementation manner of the first aspect, or the third possible implementation manner of the first aspect, in a fourth possible implementation manner of the first aspect, the performing converged calculation on the spatial coordinates of the fingertip and the spatial coordinates of the arm key portion, to determine two-dimensional coordinates, on a display screen, of an intersection point between fingertip pointing and the display screen specifically includes: determining the fingertip pointing according to the spatial coordinates of the fingertip and the spatial coordinates of the arm key portion; calculating spatial coordinates of the intersection point between the fingertip pointing and the display screen; and converting the spatial coordinates of the intersection point into the two-dimensional coordinates on the display screen according to a correspondence between a spatial coordinate system of the depth camera and a coordinate system of the display screen.

According to a second aspect, an embodiment of the present invention provides a pointing interaction apparatus, including: an obtaining module, configured to obtain a hand image and an arm image; a determining module, configured to determine spatial coordinates of a fingertip according to the hand image, and determine spatial coordinates of an arm key portion according to the arm image; and a calculation module, configured to perform converged calculation on the spatial coordinates of the fingertip and the spatial coordinates of the arm key portion, to determine two-dimensional coordinates, on a display screen, of an intersection point between fingertip pointing and the display screen.

With reference to the second aspect, in a first possible implementation manner of the second aspect, the obtaining module is specifically configured to: obtain a depth map shot by a depth camera, and extract the hand image and the arm image in the depth map according to a specified threshold of the depth map.

With reference to the first possible implementation manner of the second aspect, in a second possible implementation manner of the second aspect, after obtaining the depth map shot by the depth camera, the obtaining module is further configured to perform denoising processing on the depth map.

With reference to any one of the second aspect, the first possible implementation manner of the second aspect, or the second possible implementation manner of the second aspect, in a third possible implementation manner of the second aspect, the determining module is specifically configured to: extract a hand contour according to the hand image; and if the fingertip is not perpendicular to the display screen, determine the spatial coordinates of the fingertip by performing curvature recognition on the hand contour; or if the fingertip is perpendicular to the display screen, calculate the spatial coordinates of the fingertip by performing Gaussian distribution on the hand contour.

With reference to any one of the second aspect, the first possible implementation manner of the second aspect, the second possible implementation manner of the second aspect, or the third possible implementation manner of the second aspect, in a fourth possible implementation manner of the second aspect, the calculation module is specifically configured to: determine the fingertip pointing according to the spatial coordinates of the fingertip and the spatial coordinates of the arm key portion; calculate spatial coordinates of the intersection point between the fingertip pointing and the display screen; and convert the spatial coordinates of the intersection point into the two-dimensional coordinates on the display screen according to a correspondence between a spatial coordinate system of the depth camera and a coordinate system of the display screen.

According to a third aspect, an embodiment of the present invention provides a pointing interaction system, including: a depth camera, the pointing interaction apparatus in the second aspect, a projector connected to the pointing interaction apparatus, and a display screen, where the depth camera is configured to collect a hand image and an arm image; and the projector is configured to display a focal point in a position, corresponding to two-dimensional coordinates, on the display screen.

According to the pointing interaction method, apparatus, and system provided in the embodiments of the present invention: the pointing interaction apparatus determines spatial coordinates of a fingertip and spatial coordinates of an arm key portion according to a hand image and an arm image that are obtained; performs converged calculation on the spatial coordinates of the fingertip and the spatial coordinates of the arm key portion; and finally, determines two-dimensional coordinates, on a display screen, of an intersection point between fingertip pointing and the display screen. Therefore, the pointing interaction apparatus can implement pointing of high accuracy by using only the spatial coordinates of the fingertip and the spatial coordinates of the arm key portion, and the pointing has good real-time performance.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
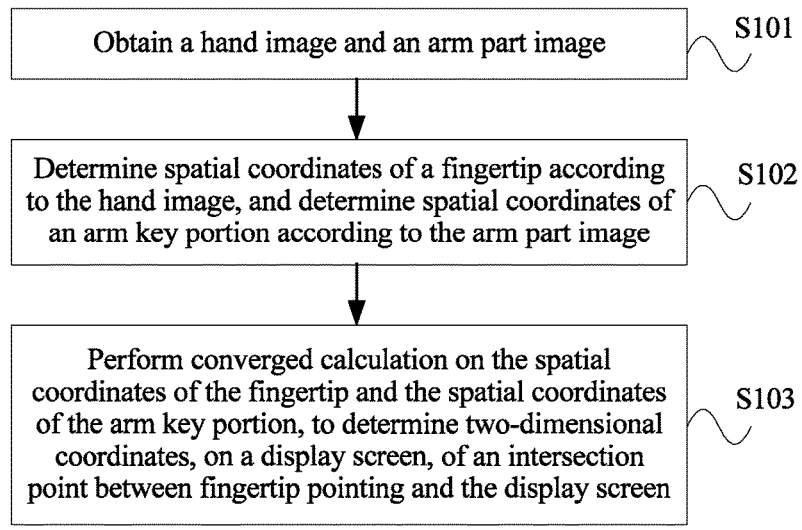
FIG. 1 is a flowchart of a pointing interaction method according to an embodiment of the present invention.

FIG. 1 is a flowchart of a pointing interaction method according to an embodiment of the present invention. The pointing interaction method provided in this embodiment may be applicable to a scenario such as teaching or conference presentation. The method may be executed by a pointing interaction apparatus, where the pointing interaction apparatus may be an intelligent device such as a computer. The pointing interaction method specifically includes the following steps:

S101: Obtain a hand image and an arm image.

Specifically, the foregoing intelligent device may obtain a hand image and an arm image of a user from a camera apparatus. A spatial correspondence between a depth camera and a display screen may be established. An orientation of the depth camera is opposite to that of the display screen, a corresponding mark is made in a specified position of the display screen, and the spatial correspondence between the depth camera and the display screen is obtained by using the mark. After a depth map shot by the depth camera is obtained, optionally, the hand image and the arm image in the depth map may be extracted according to a specified threshold of the depth map. Specifically:

After the depth map shot by the depth camera is obtained, denoising processing may further be performed on the depth map.

Specifically, because the depth map shot by the depth camera often includes relatively much noise, the pointing interaction apparatus needs to perform denoising processing on the depth map. In addition, in a process of performing a pointing action, there are particular differences of distances from a hand, an arm portion, and the like of an operator to the display screen, that is, depth values differ. Therefore, the pointing interaction apparatus may set a threshold according to the depth values of the hand, the arm portion, and the like of the operator. First, a main object in a sight range of the depth camera is a human body, general depth information of the human body may be obtained by using a detection algorithm, and further, a hand depth value is obtained by estimation according to human body depth information. Then, according to a hand depth value d, a range of [d−100, d+100] is set to a threshold of the hand image, where the threshold is in millimeters. A process of selecting a threshold of the arm image is similar to the foregoing process of obtaining the threshold of the hand image. Therefore, the hand image and the arm image in the depth map are extracted according to the specified threshold of the depth map.

S102: Determine spatial coordinates of a fingertip according to the hand image, and determine spatial coordinates of an arm key portion according to the arm image.

Specifically, the pointing interaction apparatus may extract a hand contour according to the hand image, and determine, according to whether the fingertip is perpendicular to the display screen, which algorithm is used to calculate the spatial coordinates of the fingertip. For example, when the fingertip is perpendicular to the display screen, the spatial coordinates of the fingertip are calculated by performing Gaussian distribution on the hand contour. When the fingertip is not perpendicular to the display screen, the spatial coordinates of the fingertip are determined by performing curvature recognition on the hand contour. In addition, the pointing interaction apparatus may also determine the spatial coordinates of the arm key portion such as a wrist, an elbow, and a shoulder according to the arm image.

S103: Perform converged calculation on the spatial coordinates of the fingertip and the spatial coordinates of the arm key portion, to determine two-dimensional coordinates, on a display screen, of an intersection point between fingertip pointing and the display screen.

Specifically, because the spatial coordinates of the fingertip and the spatial coordinates of the arm key portion are already determined in S102, fingertip pointing of the operator may be determined according to the spatial coordinates of the fingertip and the spatial coordinates of the arm key portion, and the spatial coordinates of the intersection point between the fingertip pointing and the display screen are determined by performing converged calculation by using the spatial coordinates of the fingertip and the spatial coordinates of the arm key portion. Specifically, the fingertip pointing may be determined by applying a spatial linear equation to the spatial coordinates of the fingertip and the spatial coordinates of the arm key portion, and a linear equation of the fingertip pointing is combined with a plane equation corresponding to the display screen, to solve for the spatial coordinates of the intersection point. In addition, the spatial coordinates of the intersection point are converted into two-dimensional coordinates according to a correspondence between a spatial coordinate system of the depth camera and a coordinate system of the display screen.

This embodiment provides a pointing interaction method, where a pointing interaction apparatus determines spatial coordinates of a fingertip and spatial coordinates of an arm key portion according to a hand image and an arm image that are obtained; and performs converged calculation on the spatial coordinates of the fingertip and the spatial coordinates of the arm key portion, to finally determine two-dimensional coordinates, on a display screen, of an intersection point between fingertip pointing and the display screen. Therefore, the pointing interaction apparatus can implement high-precision pointing only by using the spatial coordinates of the fingertip and the spatial coordinates of the arm key portion, and the pointing has good realtimeness.

Figure 2:
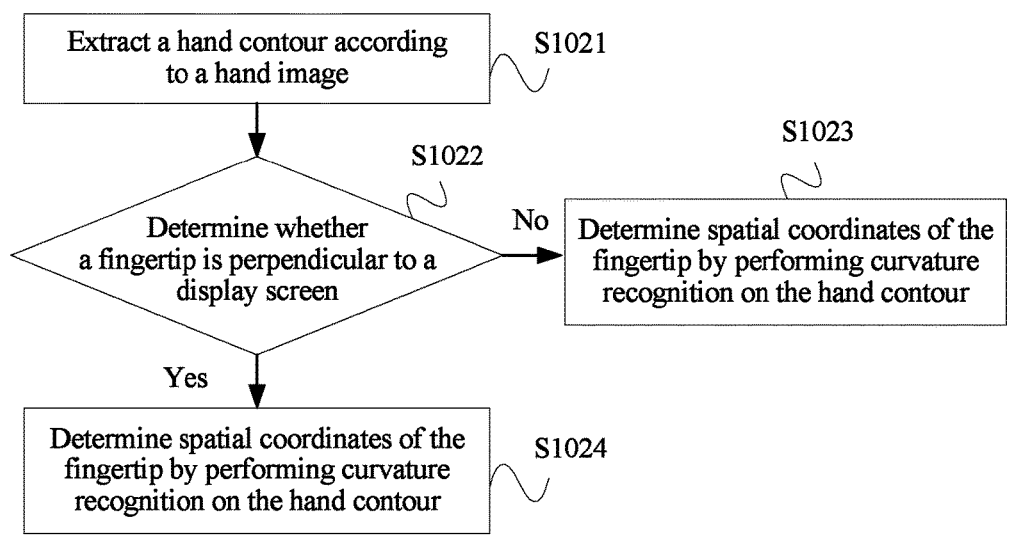
FIG. 2 is a flowchart of a method for determining spatial coordinates of a fingertip according to another embodiment of the present invention.

FIG. 2 is a flowchart of a method for determining spatial coordinates of a fingertip according to another embodiment of the present invention. Based on the previous embodiment, this embodiment provides a specific implementation manner of S102 of determining spatial coordinates of a fingertip according to the hand image, and determining spatial coordinates of an arm key portion according to the arm image, and specifically includes the following steps:

S1021: Extract a hand contour according to the hand image.

Specifically, after denoising and segmentation are performed on an original image, a binary image is obtained. A contour extraction algorithm is emptying inner points of the binary image and retaining only points on edges. In the binary image, it is assumed that a background pixel gray value is 0, and that a pixel gray value of a foreground object is 1. Each pixel in the image is scanned, and a contour extraction rule is as follows:

(1) If a central pixel is 1, and values of 8 pixels adjacent to the central pixel are all 1, the central pixel is set to 0;

(2) if a central pixel is 0, 0 is retained for the pixel regardless of which values 8 pixels adjacent to the central pixel are; or (3) all central pixels are set to 1 in a case other than (1) and (2).

It is assumed that a background of the image is black. That is, when a white pixel is scanned, if 8 adjacent pixels of the pixel are all white, the pixel point is determined as an inner point of the image, and the background black point is deleted. After scanning ends, remaining points are a contour of the image. Because the binary image obtained after segmentation has a complete contour, an edge of contour extraction has consecutiveness, thereby avoiding impact of edge breakage. In addition, an edge width obtained by using this contour extraction algorithm is a single pixel, which has relatively high edge detection precision. Because of impact of noise, a boundary of the image obtained after thresholding is quite not smooth, and there are more or less burrs. In addition, there is also a noise hole in an object area, and a mathematical morphology operation needs to be performed to filter a small noise object, so as to improve image quality for subsequent processing.

S1022: Determine whether the fingertip is perpendicular to the display screen.

Specifically, when the hand contour detected by the pointing interaction apparatus is not obvious, and is a pattern similar to a cycle, the pointing interaction apparatus determines that the fingertip and the display screen are in a perpendicular relationship. If the fingertip is perpendicular to the display screen, step S1024 is executed; or if, it is determined that the fingertip is not perpendicular to the display screen, and step S1023 is performed.

S1023: Determine the spatial coordinates of the fingertip by performing curvature recognition on the hand contour.

Specifically, if the fingertip is not perpendicular to the display screen, the spatial coordinates of the fingertip are determined by means of curvature recognition. A curvature calculation formula is as follows:

$$K_1(p) = \frac{1}{2}\left[\frac{1 + \overline{P_1P} - \overline{PP_2}}{|\overline{P_1P}||\overline{PP_2}|}\right],$$

where $P_1$, P, and $P_2$ are consecutive points on the contour, P is located between $P_1$ and $P_2$, and the points are separated by one contour pixel. In the algorithm, $K_1(p)$ values of all points on the contour in different scales are calculated, where a different scale means that a parameter 1 is different. If the point P on the contour meets the following two conditions, the point P is determined as the fingertip:

(1) $K_1(p)$ exceeds a threshold in at least one scale; and (2) $K_1(p)$ is a local maximum value (different detection scales are independent of each other) in a neighborhood on the contour.

S1024: Calculate the spatial coordinates of the fingertip by performing Gaussian distribution on the hand contour.

Specifically, if the fingertip is not perpendicular to the display screen, the pointing interaction apparatus first obtains depth values of all pixels in an image that is formed by the hand contour and is similar to a cycle, and their spatial coordinate values, and uses a depth value x of each pixel as an input value of a Gaussian distribution formula, where the Gaussian distribution formula is specifically as follows:

$$f(x) = \frac{1}{\sigma\sqrt{2\pi}} e^{-\frac{(x-\mu)^2}{2\sigma^2}}.$$

In the Gaussian distribution formula, probability distribution corresponding to the depth value of each pixel is output, and a pixel with a smallest probability value is a position of the fingertip. The pointing interaction apparatus may determine the spatial coordinates of the fingertip.

This embodiment provides a method for determining spatial coordinates of a fingertip. A pointing interaction apparatus first determines a position relationship between the fingertip and a display screen, so as to accurately calculate the spatial coordinates of the fingertip by using a curvature recognition algorithm or a Gaussian distribution algorithm. Therefore, the pointing interaction apparatus can implement high-precision pointing only by using the spatial coordinates of the fingertip and spatial coordinates of an arm key portion, and the pointing has good realtimeness.

Figure 3:
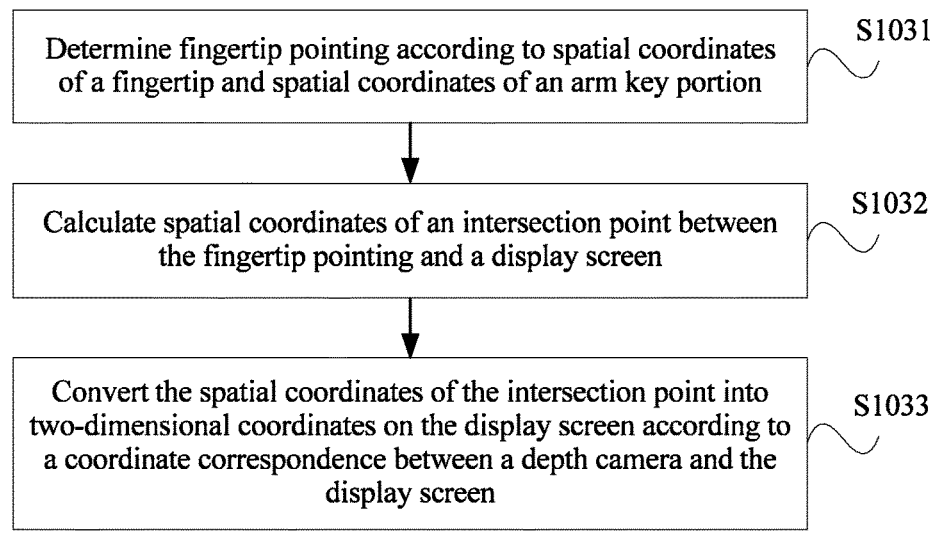
FIG. 3 is a flowchart of a method for determining two-dimensional coordinates of an intersection point between fingertip pointing and a display screen according to still another embodiment of the present invention.

FIG. 3 is a flowchart of a method for determining two-dimensional coordinates of an intersection point between fingertip pointing and a display screen according to still another embodiment of the present invention. Based on the embodiment corresponding to FIG. 1, this embodiment provides a specific implementation manner of S103 of performing converged calculation on the spatial coordinates of the fingertip and the spatial coordinates of the arm key portion, to determine two-dimensional coordinates, on a display screen, of an intersection point between fingertip pointing and the display screen, and specific steps are as follows:

S1031: Determine the fingertip pointing according to the spatial coordinates of the fingertip and the spatial coordinates of the arm key portion.

Specifically, it is assumed that the coordinates of the fingertip are $(x_1, y_1, z_1)$, and that coordinates of a wrist in the arm key portion are $(x_2, y_2, z_2)$. Then, the fingertip pointing may be determined by using the following spatial linear equation:

$$\frac{x - x_1}{x_2 - x_1} = \frac{y - y_1}{y_2 - y_1} = \frac{z - z_1}{z_2 - z_1}.$$

S1032: Calculate spatial coordinates of the intersection point between the fingertip pointing and the display screen.

Specifically, the display screen may be represented by $z = -ky - b$, where an angle of depression of a depth camera is represented by $\theta$, $k = \tan\theta$, and b represents a horizontal distance between the depth camera and the display screen. Then, the spatial coordinates of the intersection point between the fingertip point and the display screen may be calculated by using the foregoing two formulas:

$$y = \frac{(z_2 - z_1)y_1 - (y_2 - y_1)(z_1 + b)}{(z_2 - z_1 + ky_2 - ky_1)}, x = \frac{y - y_1}{y_2 - y_1} \times (x_2 - x_1) + x_1,$$

and $z = -ky - b$.

S1033: Convert the spatial coordinates of the intersection point into the two-dimensional coordinates on the display screen according to a coordinate correspondence between a depth camera and the display screen.

Figure 4:
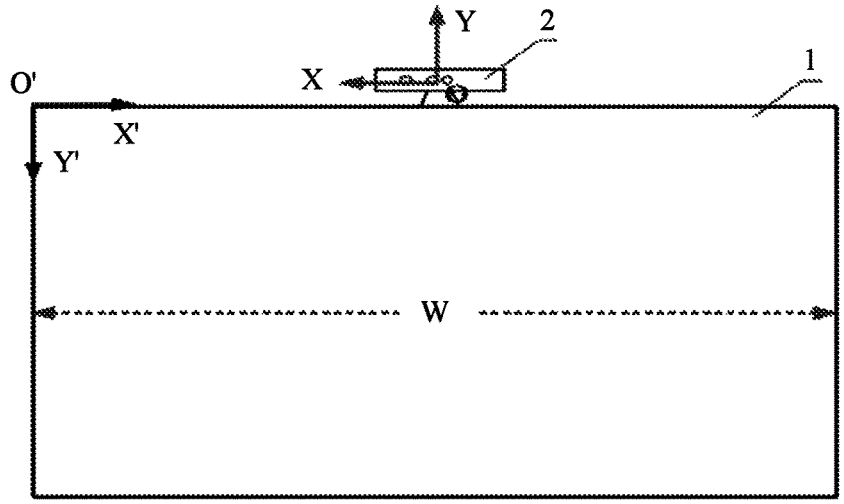
FIG. 4 is a schematic diagram of a correspondence between a spatial coordinate system and a planar coordinate system of a display screen.

Specifically, FIG. 4 is a schematic diagram of a correspondence between a spatial coordinate system and a planar coordinate system of a display screen. The two-dimensional coordinates, on the display screen, of the intersection point between the the fingertip point and the display screen may be determined by using a spatial coordinate system 1 and a display screen 2. Specifically, it is assumed that the two-dimensional coordinates, on the display screen, of the intersection point between the the fingertip point and the display screen are (x', y'); then, as shown in FIG. 4, $$x' = \frac{W}{2} + x,$$

and y'=−y, where W represents a width of the display screen.

This embodiment provides a method for determining two-dimensional coordinates of an intersection point between fingertip pointing and a display screen, including: calculating spatial coordinates of an intersection point by using equations of fingertip pointing and a display screen, and finally, converting the spatial coordinates of the intersection point into two-dimensional coordinates on the display screen according to a coordinate correspondence between a depth camera and the display screen. Therefore, a pointing interaction apparatus can implement high-precision pointing only by using spatial coordinates of a fingertip and spatial coordinates of an arm key portion, and the pointing has good realtimeness.

Figure 5:
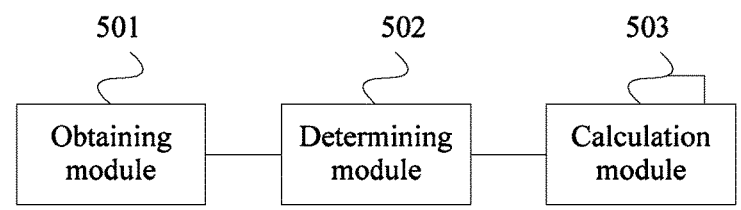
FIG. 5 is a schematic structural diagram of a pointing interaction apparatus according to an embodiment of the present invention.

FIG. 5 is a schematic structural diagram of a pointing interaction apparatus according to an embodiment of the present invention, including an obtaining module 501, a determining module 502, and a calculation module 503. The pointing interaction apparatus may be an intelligent device such as a computer.

Specifically, the obtaining module 501 is configured to obtain a hand image and an arm image; the determining module 502 is configured to determine spatial coordinates of a fingertip according to the hand image, and determine spatial coordinates of an arm key portion according to the arm image; and the calculation module 503 is configured to perform converged calculation on the spatial coordinates of the fingertip and the spatial coordinates of the arm key portion, to determine two-dimensional coordinates, on a display screen, of an intersection point between fingertip pointing and the display screen. Further, the obtaining module 501 is specifically configured to obtain a depth map shot by a depth camera, and extract the hand image and the arm image in the depth map according to a specified threshold of the depth map. After obtaining the depth map shot by the depth camera, the obtaining module 501 is further configured to perform denoising processing on the depth map.

Further, the determining module 502 is specifically configured to: extract a hand contour according to the hand image; and if the fingertip is not perpendicular to the display screen, determine the spatial coordinates of the fingertip by performing curvature recognition on the hand contour; or if the fingertip is perpendicular to the display screen, calculate the spatial coordinates of the fingertip by performing Gaussian distribution on the hand contour.

Further, the calculation module 503 is specifically configured to: determine the fingertip pointing according to the spatial coordinates of the fingertip and the spatial coordinates of the arm key portion, calculate spatial coordinates of the intersection point between the fingertip pointing and the display screen, and convert the spatial coordinates of the intersection point into the two-dimensional coordinates on the display screen according to a correspondence between a spatial coordinate system of the depth camera and a coordinate system of the display screen.

The pointing interaction apparatus in this embodiment may be configured to execute the technical solutions of the embodiment of the pointing interaction method, an implementation principle and a technical effect thereof are similar, and details are not described herein.

Figure 6:
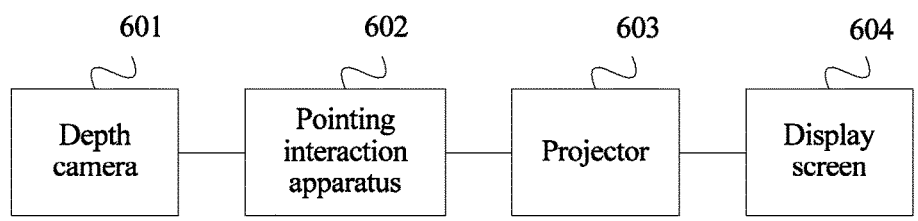
FIG. 6 is a pointing interaction system according to an embodiment of the present invention.

FIG. 6 is a pointing interaction system according to an embodiment of the present invention, including: a depth camera 601, the pointing interaction apparatus 602 in the previous embodiment, a projector 603 connected to the pointing interaction apparatus 602, and a display screen 604.

The pointing interaction system in this embodiment includes the pointing interaction apparatus in the previous embodiment. The pointing interaction apparatus may be configured to execute the technical solutions of the embodiment of the pointing interaction method, an implementation principle and a technical effect thereof are similar, and details are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A pointing interaction method comprising:
   obtaining a hand image and an arm image;
   determining $(x_1,y_1,z_1)$ spatial coordinates of a fingertip according to the hand image by performing curvature recognition on a hand contour or performing Gaussian distribution of the hand contour, and
   determining $(x_2,y_2,z_2)$ spatial coordinates of an arm key portion according to the arm image;
   determining a fingertip pointing direction by applying a spatial linear relationship to the spatial coordinates of the fingertip and the spatial coordinates of the arm key portion;
   determining (x,y,z) spatial coordinates, on a display screen, of an intersection point between the fingertip pointing direction and the display screen by applying the spatial linear expression describing the fingertip pointing direction and a planar expression describing a surface of the display screen to determine the intersection point, wherein the spatial linear relationship applied for determining the fingertip pointing direction is a spatial linear expression defined as $$\frac{x-x_1}{x_2-x_1} = \frac{y-y_1}{y_2-y_1} = \frac{z-z_1}{z_2-z_1}$$

and the planar expression is $$z=-ky-b;$$

where $k=\tan\theta$, b represents a horizontal distance between a depth camera and the display screen and $\theta$ is an angle of depression of the depth camera;
   converting the (x, y, z) spatial coordinates of the intersection point into (x',y') two-dimensional coordinates according to a correspondence between a spatial coordinate system of the depth camera and a coordinate system of the display screen, where x'=w/2 +x, and y'=−y, and where W represents a width of the display screen; and
   displaying, on the display screen, a point in a position corresponding to the two-dimensional coordinates of the intersection point.

2. The method according to claim 1, wherein obtaining the hand and arm images comprises:
   obtaining a depth map acquired by the depth camera; and
   extracting the hand and arm images in the depth map according to a threshold of the depth map.

3. The method according to claim 2, wherein after obtaining the depth map acquired by the depth camera, the method further comprises performing denoising processing on the depth map.

4. The method according to claim 1, wherein determining spatial coordinates of the fingertip according to the hand image comprises:
   extracting a hand contour according to the hand image; and
   if the fingertip is not perpendicular to the display screen, determining the spatial coordinates of the fingertip by performing curvature recognition on the hand contour; or
   if the fingertip is perpendicular to the display screen, calculating the spatial coordinates of the fingertip by performing the Gaussian distribution on the hand contour.

5. The method according to claim 3, wherein after performing the denoising processing on the depth map, the method further comprises:
   segmenting the hand image;
   obtaining a binary image from the hand image; and
   extracting a hand contour according to the hand image.

6. The method according to claim 5, wherein extracting the hand contour according to the hand image comprises:
   emptying inner points of the binary image using a contour extraction algorithm; and
   retaining only points on edges of the binary image using the contour extraction algorithm, wherein an edge width of the edges of the binary image obtained using the contour extraction algorithm is a single pixel.

7. The method according to claim 5, wherein the extracting a hand contour according to the hand image comprises:
   scanning each pixel of the binary image, the scanning comprising, according to a contour extraction rule:

(a) if a central pixel of the binary image is has a value of 1 and eight pixels adjacent to the central pixel each have values of 1, setting the central pixel of the binary image to 0;
(b) if, regardless of any of the values of the eight pixels adjacent to the central pixel, the central pixel has a value of 0, retaining the value of 0 for the central pixel; and
(c) if condition (a) is not met or if condition (b) is not met, setting the values of all central pixels to 1,
wherein, after the scanning ends, remaining points in the binary image are a continuous contour of the hand image.

8. The method according to claim 4, wherein the determining the spatial coordinates of the fingertip by performing curvature recognition of the hand contour when the fingertip is not perpendicular to the display screen comprises:
calculating values of $K_1(p)$ of all points on the hand contour according to a curvature calculation formula defined as:

$$K_1(p) = \frac{1}{2}\left[\frac{1 + \overline{P_1P} - \overline{PP_2}}{|\overline{P_1P}||\overline{PP_2}|}\right],$$

wherein:
$P_1$, P, and $P_2$ are consecutive points on the contour;
P is located between $P_1$ and $P_2$; and
the points are separated by one pixel contour.

9. The method according to claim 8, wherein the determining spatial coordinates of a fingertip according to the hand image further comprises:
determining the point P as the fingertip if the point P on the contour meets both of two conditions:
(i) $K_1(p)$ exceeds a threshold in at least one scale; and
(ii) $K_1(p)$ is a local maximum value in a neighborhood of the contour, wherein different detection scales are independent of each other.

10. A pointing interaction apparatus comprising:
a processor in communication with a non-transitory storage medium storing program instructions for execution by the processor, which when executed by the processor, cause the processor to be configured to provide the following operations:
obtain a hand image and an arm image;
determine $(x_1, y_1, z_1)$ spatial coordinates of a fingertip according to the hand image by performing curvature recognition on a hand contour or performing Gaussian distribution of the hand contour, and
determine $(x_2, y_2, z_2)$ spatial coordinates of an arm key portion according to the arm image;
determine a fingertip pointing direction by applying a spatial linear relationship to the spatial coordinates of the fingertip and the spatial coordinates of the arm key portion;
determine (x,y,z) spatial coordinates, on a display screen, of an intersection point between the fingertip pointing direction and the display screen by applying the spatial linear expression describing the fingertip pointing direction and a planar expression describing a surface of the display screen to determine the intersection point, wherein the spatial linear relationship applied for determining the fingertip pointing direction is a spatial linear expression defined as $$\frac{x - x_1}{x_2 - x_1} = \frac{y - y_1}{y_2 - y_1} = \frac{z - z_1}{z_2 - z_1}$$

and the planar expression is $$z = -ky - b;$$

where k=tan θ, b represents a horizontal distance between a depth camera and the display screen and θ is an angle of depression of the depth camera;
convert the (x, y, z) spatial coordinates of the intersection point into (x',y') two-dimensional coordinates according to a correspondence between a spatial coordinate system of the depth camera and a coordinate system of the display screen, where x'=w/2 +x, and y'=−y, and where W represents a width of the display screen; and
display, on the display screen, a point in a position corresponding to the two-dimensional coordinates of the intersection point.

11. The apparatus according to claim 10, wherein the processor is further configured to: obtain a depth map acquired by the depth camera, and extract the hand image and the arm image in the depth map according to a specified threshold of the depth map.

12. The apparatus according to claim 11, wherein after obtaining the depth map acquired by the depth camera, the processor is further configured to perform denoising processing on the depth map.

13. The apparatus according to claim 10, wherein the processor is further configured to:
extract a hand contour according to the hand image; and
if the fingertip is not perpendicular to the display screen, determine the spatial coordinates of the fingertip by performing curvature recognition on the hand contour; or
if the fingertip is perpendicular to the display screen, calculate the spatial coordinates of the fingertip by performing the Gaussian distribution on the hand contour.

14. The apparatus according to claim 13, wherein, to determine the spatial coordinates of the fingertip according to the hand image by performing curvature recognition on the hand contour when the fingertip is not perpendicular to the display screen, the processor is further configured to:
calculate values of $K_1(p)$ of all points on the hand contour according to a curvature calculation formula defined as:

$$K_1(p) = \frac{1}{2}\left[\frac{1 + \overline{P_1P} - \overline{PP_2}}{|\overline{P_1P}||\overline{PP_2}|}\right],$$

wherein:
$P_1$, P, and $P_2$ are consecutive points on the contour;
P is located between $P_1$ and $P_2$; and
the points are separated by one pixel contour.

15. A pointing interaction system comprising:
a depth camera;
a pointing interaction apparatus for
obtaining a hand image and an arm image;
determining $(x_1, y_1, z_1)$ spatial coordinates of a fingertip according to the hand image by performing curvature recognition on a hand contour or performing Gaussian distribution of the hand contour,
determining $(x_2, y_2, z_2)$ spatial coordinates of an arm key portion according to the arm image;

determining a fingertip pointing direction by applying a spatial linear relationship to the spatial coordinates of the fingertip and the spatial coordinates of the arm key portion;

determining (x,y,z) spatial coordinates of an intersection point between the fingertip pointing direction and a display screen by applying the spatial linear expression describing the fingertip pointing direction and a planar expression describing a surface of the display screen to determine the intersection point, wherein the spatial linear relationship applied for determining the fingertip pointing direction is a spatial linear expression defined as $$\frac{x-x_1}{x_2-x_1} = \frac{y-y_1}{y_2-y_1} = \frac{z-z_1}{z_2-z_1}$$

and the planar expression is $z=-ky-b;$ where $k=\tan\theta$, b represents a horizontal distance between a depth camera and the display screen and $\theta$ is an angle of depression of the depth camera; and converting the (x, y, z) spatial coordinates of the intersection point into (x',y') two-dimensional coordinates according to a correspondence between a spatial coordinate system of the depth camera and a coordinate system of the display screen, where $x'=w/2 +x$, and $y'=y$, and where W represents a width of the display screen; and a projector connected to the pointing interaction apparatus and the display screen, wherein the depth camera is configured to collect the hand image and the arm image, and wherein the projector is configured to display the intersection point in a position, corresponding to the two-dimensional coordinates, on the display screen.

* * * * *